July 11, 1939. E. V. MURPHREE ET AL 2,165,807
METHOD FOR THE SEPARATION OF MIXTURES OF LIQUID AND SOLID CONSTITUENTS
Filed May 3, 1933 2 Sheets-Sheet 1

Eger V. Murphree  Inventors
Edward D. Reeves
W. E. Currie  Attorney

Patented July 11, 1939

2,165,807

UNITED STATES PATENT OFFICE 2,165,807

METHOD FOR THE SEPARATION OF MIXTURES OF LIQUID AND SOLID CONSTITUENTS

Eger V. Murphree and Edward D. Reeves, Baton Rouge, La., assignors to Standard Oil Development Company, a corporation of Delaware Application May 3, 1933, Serial No. 669,084

7 Claims. (Cl. 210—63)

The present invention relates to improvements in the method of separating liquid and solid components from their mixtures and more specifically to an improved filtration method which is particularly applicable to the separation of solids of the type or quality making such separation difficult by the ordinary filtration methods. The invention will be fully understood from the following description and the drawings.

The art of filtration is old and has been successfully applied to the separation of many types of solids from their suspension in liquids, but in general, it has been most successful when the solid is granular and of sufficient strength to form a loose cake which does not pack deeply into the filter membrane under the pressure imposed. Materials of a soft or gelatinous quality have always been difficult to filter because of the fact that they are forced too deeply into the filter meshes, eventually plugging and preventing further flow. In many instances, while filtration may be carried out for a short time or if it is done in batch, one cycle may be employed, but on succeeding cycles or batches, flow becomes more and more difficult. Cleaning methods must then be employed to free the filter membrane between cycles. Heretofore, progress in filtration of materials of this latter type had been in the direction of modifying the character of the filter cake, for example, by adding solid granular materials, known as filter aids, which assisted in forming a loose cake of mechanical strength. While such methods are used widely, they have obvious disadvantages which the present invention completely eliminates.

In its broadest conception, the present invention comprises the filtration of a mixture of solid suspended in a liquid of different specific gravity under the influence of differential filtration pressures, that is to say, under pressures which are exerted to a different degree on the liquid and solid constituents of the mixture, the filtration pressure exerted on the liquid being greater than that on the solid and preferably the difference is greater than the force of gravity.

The result of the present improved methods is that the liquid may be forced into and through the filter membrane under a pressure greatly in excess of that exerted upon the solid so that there is no tendency to push the solid deeply into the filter meshes and filtration may be carried out continuously for relatively long periods with no tendency to plug the filter blankets, or in successive batches for an almost indefinite period without the necessity of back washing or similar steps between such batches to free the blanket.

The method is, in short, one in which the filter is automatically and continuously cleaned, and there is no need for expensive and time-consuming cleaning operations, nor is there necessity for filter aids, although, of course, such materials are not objectionable.

Figures 1, 2:
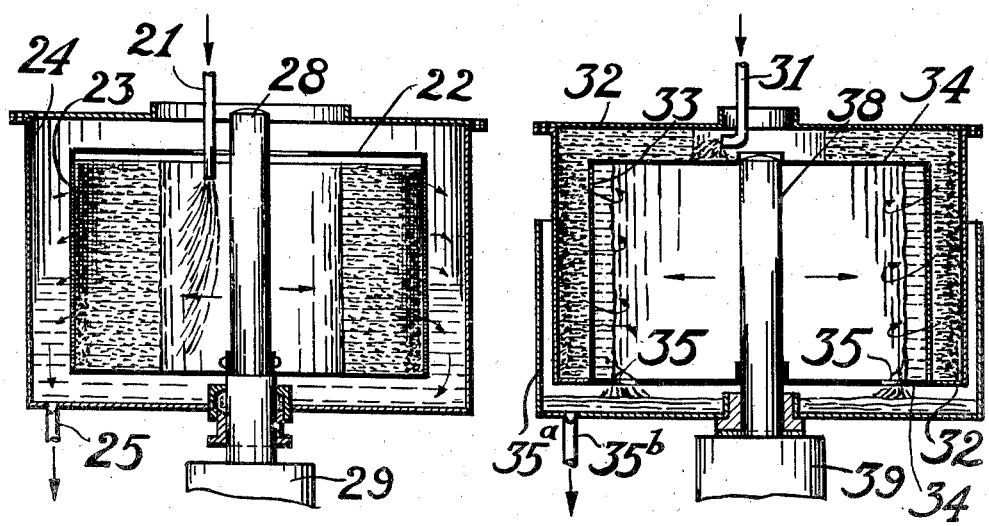
Figure 1 shows a filtration apparatus utilizing centrifugal force and particularly adapted to mixtures in which the liquid component has a higher density than the solid.
Figure 2 shows a similar centrifugal filter adapted to the separation of mixtures in which the solid components have a greater density than the liquid.

Referring to the drawings, in Fig. 1, a centrifugal filter is shown, which is adapted to the filtration of suspensions in which the liquid has a greater density than the solid. The slurry is fed in by a pipe 21 into the basket 22. This basket is conveniently in a cylindrical form, with the filter membrane 23 arranged on the side walls. The receiving chamber in this embodiment of the invention comprises an outer drum 24, which is stationary. Power may be applied by a motor 29 to a central shaft 28. The basket 22 is rigidly connected to the central shaft and passes through the outer casing 24 by means of a stuffing box, as shown. The solid material is therefore impressed with a force of less intensity than that which is exerted on the liquid, due to the lesser density of the former, and consequently it is not forced deeply into the filter cloth. The above apparatus is diagrammatic, and for convenience and simplicity, details are not shown. For example, a helical screw may be provided inside the basket and adapted to lightly scrape the side walls so as to continuously remove the solid cake. Apparatus of this type is well known in the art and need not be illustrated. The apparatus may be constructed along other lines without departing from the spirit of the present invention. For example, power may be applied from the upper end of the shaft 29 or the shaft may be placed horizontally if desired since the force obtained by centrifugal action is so great as to make the gravitational force negligible.

In Figure 2, a centrifugal filter is shown which differs from the type previously illustrated in Figure 1. In this case, the apparatus is adapted to a separation of mixtures in which the solid component has the greater density than the liquid. The apparatus may consist of cylindrical shells 32 and 34, the side walls of the inner shell 34 being composed of the filter medium. The slurry is fed into the annular space between the shells by means of a pipe 31 which conveniently discharges near the axis of rotation. As distinguished from the prior case, the solid material is now impressed with a greater centrifugal force than is exerted on the liquid but this force acts outwardly and consequently the "filtration" pressure acting inwardly is greater on the liquid and it passes readily through the filtration medium and into the inner shell 34, from which it then drains through the holes 35 into a stationary outer shell 35a, and from there by a pipe 35b. The two shells 32 and 34 may both be conveniently rotated and may be rigidly connected to the central shaft 38. Power is applied by the motor 39 as before.

Figure 3:
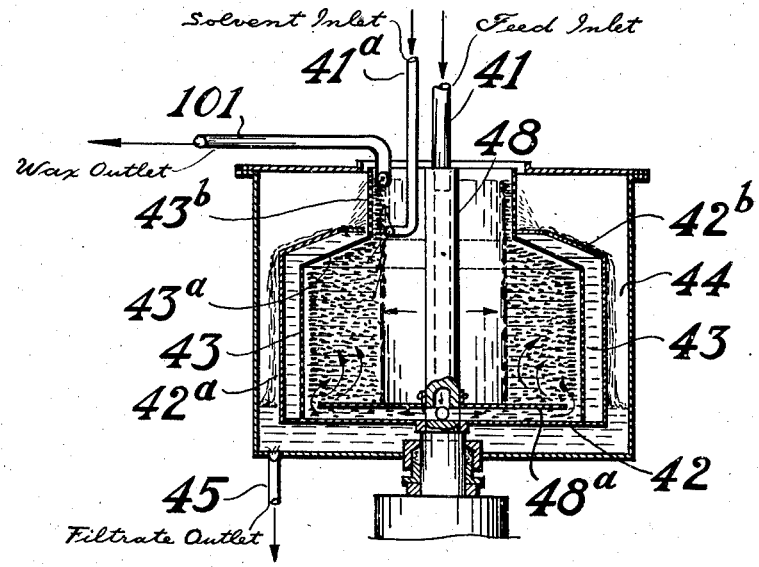
Figure 3 shows an apparatus similar to that of Figure 1, except that it is particularly adapted to continuous operation.

In Figure 3 a continuous apparatus adapted to operate with solvents heavier than wax is illustrated. The feed pipe 41 is a part of the main shaft 48 which supports the basket 42 and discharges beneath a directing plate 48a. The side wall 43 of the basket is the filtration membrane. This is narrowed down at the upper portion by means of a solid section 43a, over which the wax cake is forced on to a second filtration membrane 43b. Fresh solvent or wash liquor is continuously admitted by a pipe 41a, and drains through the membrane 43b. The washed wax continues to flow upwardly and is drawn off through the pipe 101, which is fitted with a spade or scoop mouth.

The basket 42 is fitted with an outer cylindrical wall 42a, leaving an annular space between itself and the membrane 43 in which the filtrate collects. This filtrate flows over an inwardly projected portion 42b of the cylindrical wall 42a, and into the outer collection space 44. The solid portion of the cylindrical wall 42b is preferably extended inwardly beyond the membrane 43, as illustrated on the drawings, and the distance to which it extends beyond the membrane may be suitably adjusted to give the best results with the particular type of wax and solvent mixture used.

Figure 4:
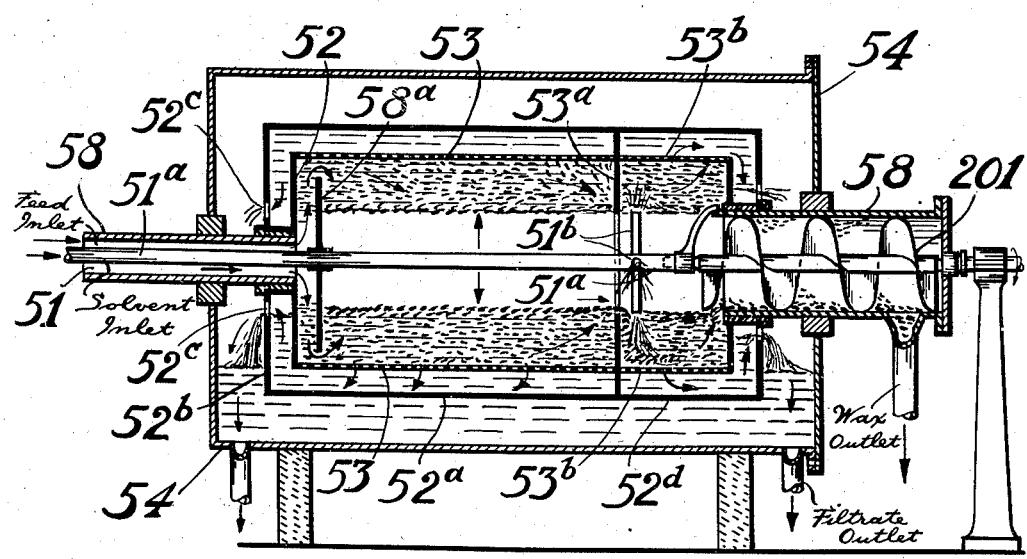
Figure 4 is similar to Figure 2 except that it shows different mechanical arrangements adapted for horizontal drive.

In Figure 4 the main shaft 58 is hollow and is horizontally disposed. A pipe 51a is placed within the hollow shaft and the annular space 51 between said pipe and the hollow shaft comprises the main feed duct. The feed discharges continuously into the basket 52 being directed by a baffle 58a. The filtration membrane 53 makes up the cylindrical surface of the basket. A drum 52a of sheet metal incloses the basket and preferably rotates with it. It is provided with an end wall 52b, which is fitted with suitable openings 52c into an outer stationary collection drum 54. It will be understood that the feed passing inwardly by means of pipe 51, is filtered by the filtration membrane 53 and the filtrate is first collected in the drum 52a, from which it is passed into the collection drum 54, from which it is drawn. The filtration membrane may be divided into two portions, the primary portion 53, which has been referred to above, and a secondary portion 53b. These parts are separated by a baffle 53a which is tightly affixed to the filtration membrane. The wax cake flows over this baffle and then across the secondary membrane 53b where it is washed with solvent admitted by means of the pipe 51a, referred to above, and suitable arms 51b.

The drum or shell 52a may be extended as 52d to enclose the secondary filtration membrane 53b, and arrangement may be made to separately collect the wash liquor passing through the secondary filtration membrane or it may be admixed with the primary filtrate. The shaft 58 is preferably much enlarged at the discharge end, so as to permit fitting therein a helical screw 201. This screw is adjusted to continuously force the wax out of the basket as will be understood. Suitable stuffing and bearing arrangements are indicated on the drawings, and suitable means are provided for driving the basket and screw 201. The screw may be attached rigidly to the plugged end of the pipe, 51a, and the whole may be either stationary or may be rotated, either by a separate mechanism or by the same as is used to drive the basket. The speeds of the shaft 58 and the screw 201 are preferably different, as will be understood, in order to cause a scraping of the inner side of the enlarged shaft by the helical screw. Variations may be made in the details of the apparatus without departing from the spirit of the invention.

As stated above, the present filtration method in which differential pressures are used, is adapted to all types of solid materials. The method of centrifugal filtration illustrated in Figures 1, 3 and 4, or 2, is preferable to the other methods which are chiefly applicable to special cases, while the centrifugal filtration method is generally applicable to all cases. Among the problems to which the preferred method may be successfully applied may be mentioned the filtration of waxes from petroleum lubricating oils. It is of considerable advantage, even in the case of the waxes of good crystal form which are now ordinarily filtered because of the elimination of all necessity for cleaning the filter blanket and because of the high capacities possible, but it is of especial advantage in filtration of the petrolatum waxes which are characterized by poor crystal structure and which have not been heretofore considered filterable except by means of filter aids. Vegetable, animal and marine oils may also be filtered in the same manner as well as solutions of natural or artificial resins, gums, and the like. Sugar solutions are readily treated by this means and the filtration method finds a good application in connection with the defecation process in which lime and phosphoric acid are added to the sugar liquor and must then be removed. Fruit juices, honey, glues and similar organic materials are readily filtered by the present means and it is applicable to inorganic precipitates of a gelatinous type such as ferric, chromic and aluminum hydroxide and silicic acid and related compounds. Ordinary granular materials can also be filtered by the present means with marked advantage.

To more fully explain and illustrate the method, it is an advantage to discuss more completely one application to a particular case and the case selected is that of the removal of waxy hydrocarbons from petroleum lubricating oils, hydrogenated lubricating oils, synthetic lubricants and the like. In this process, the oil which may be a distillate or slop distillate, a residue, or even a crude oil, is ordinarily diluted so as to obtain a suspension liquid of relatively low viscosity.

The process is even applicable to dirty waxes, that is, such as contain small or even considerable quantities of asphalts or resinous materials which ordinarily completely plug the filter blanket. The nature of the solvent will be discussed more fully below, but in any case, the oily liquid is brought to a temperature at which the wax is in solid form. The particular temperature may often be as low as 0° or 10° F., or even well below 0° F., depending on the character and amount of the wax, the solvent, and the degree of separation desired. At the wax precipitation temperature, the oil mixture is fed into the centrifugal filter, which is, in general, of the form either as illustrated in Figures 1, 3 and 4, or 2, depending on whether a heavy or a light solvent is used.

The filter is rotated at a moderate speed, for example, about 1,000 to 4,000 R. P. M. or thereabout. Since separation is accomplished by filtration and not by centrifugal force, the extremely high speeds, say 9,000 R. P. M. and upward required for centrifugal separation are not used. With a small filter of 12" diameter, a speed of, say 1000 to 3600 R. P. M. is satisfactory. With large units, for example, of a diameter from 36" to 48", correspondingly lower speeds may be used, although it will be understood that the character of the wax and of the filtration medium naturally affects the most desirable filtration pressure.

The total wax content of the oil may be removed in one single filtration by operating at a sufficiently low temperature, but if desired, a series of centrifugal filters may be arranged to operate at successively lower temperatures or the composition of the diluent may be changed between stages to drop out additional crops of wax. After the separation of the wax, it may be washed with further quantities of the diluent or the process may be made continuous, for example, as indicated above. The wax is ordinarily obtained in a mushy form, but it may be substantially oil free and the solvent can be removed by distillation with steam or under vacuum. In no case has it been found necessary to wash the filter blanket in order to maintain a high rate of filtration over a long period the reason being that in all of these filtration operations, differential filtration pressures are used; that is to say, that the "filtration" pressure exerted on the liquid is greater than that upon the solid. By "filtration" pressure is meant the pressure forcing such constituents against the filter blanket.

As to the solvents, a great variety may be used which are in general of the type capable of freely admixing with the viscous oils but which have a low solvent power for waxes, particularly at low temperatures. Of this class of solvents, those which are heavier than water are preferred, especially for use with waxes of the petrolatum or slop type which, as stated above, are ordinarily considered unfilterable, except through the use of filter aids. The reason for the preference of these solvents is that by their use substantial differences in the density of the liquid constituents and precipitated wax particles can be obtained. Of these solvents, heavier than water, the halogenated hydrocarbons especially the chlorinated, are most useful. For example, dichlorethylene, trichlorethylene, tetrachlorethylene, ethylenedichloride and the corresponding propylene and butylene compounds, the chlorinated acetylene derivatives or mixtures of these different solvents. Naphtha and aromatic hydrocarbons may be added to the chlorinated solvent to increase oil solubility but in such cases the amount should be insufficient to produce a solvent-oil mixture of less density than the wax. Particular mixtures as follows are especially desirable:

|  | Percent |
|---|---|
| Ethylenedichloride | 75 |
| Carbon tetrachloride | 25 |
| Ethylenedichloride | 75 |
| Trichlorethylene | 25 |
| Ethylenedichloride | 60 |
| Dichlorethylene | 40 |
| Ethylenedichloride | 50 |
| Propylenedichloride | 50 |
| Propylenedichloride | 100 |
| Propylenedichloride | 85 |
| Carbon tetrachloride | 15 |
| Ethylenedichloride | 85 |
| Toluol | 15 |

As indicated above, such liquids are used in amount sufficient to increase the density of the liquid constituents well over that of the solid wax and should be used in a centrifugal filter of the general type shown in Figures 1, 3 and 4.

Solvents lighter than the oil may be used. For example, naphtha or lighter hydrocarbons, such as petroleum ether or liquefied hydrocarbon gases. These may be used alone but preferably in admixture with oxygenated liquids which have little or no solvent power for wax, for example, alcohols, ketones, acids and esters. The alcohols from methyl to amyl, including normal, secondary and tertiary structures, are suitable, and among the ketones, acetone, diethyl and methyl-ethyl ketone may be used. Acetic acid and other lower fatty acids such as propionic acids may serve as examples of suitable acids, while the lower esters such as the methyl, ethyl and propyl esters of these acids, including formic acid, may also be used. Naphtha may be replaced by benzol, toluol and xylol or their hydrogenated derivatives. These solvents are in all cases lighter than the solid wax and are adapted to be used in an apparatus of the general type shown in Figure 2.

Examples of especially good mixtures are as follows:

|  | Percent |
|---|---|
| Toluol | 66.7 |
| Isopropyl alcohol | 33.3 |
| Secondary amyl acetate | 100 |
| Toluol | 37 |
| Secondary butyl acetate | 63 |
| Naphtha | 38 |
| Ethyl carbonate | 62 |
| Toluol | 60 |
| Acetone | 40 |
| Naphtha | 22 |
| Secondary amyl alcohol | 78 |
| Naphtha | 10 |
| Benzol | 45 |
| Ethyl alcohol | 45 |

The solvent ratios, that is, the volume of solvent used as compared with the volume of heavy oil, may vary considerably with the nature of the solvent, as might be expected, but ordinarily the ratio is in excess of one to one and two or three to one are frequently used to secure the best result. The most suitable ratio will be readily determined by trial with the particular stock to be dewaxed.

Centrifugal filters may be used conveniently in the batch method in which the basket is filled with the slurry and then spun, or semi-continuously in which the filter is fed for a prolonged period with the chilled mixture of oil and wax while it is in motion and until the filter has accumulated a cake of from 2 to 8 inches of wax. Usually 10 to 30 minutes or more is sufficient although it may be longer. The cake is then washed by introduction of additional solvent which washes out the oil. Furthermore, the separation may be made continuous by providing an adequate means for continuous removal of the wax cake as indicated before, and shown in Figures 3 and 4.

The centrifugal filtration method fits well into the regular refinery operation and may displace the present wax separation methods but it may be used in conjunction with present methods, for example, it may be desirable to produce a petrolatum by the ordinary methods, say by cold settling or centrifugation of a slop distillate or residue to obtain a low pour oil. The petrolatum may then be treated by the present centrifugal filtration method at temperatures of 80 to 100° F. so as to yield a wax of high melting point and an oil of relatively high pour point, say 50 to 75° F. which can be recycled to the prior separation step or separated by centrifugal filtration at lower temperatures.

As examples of the method of separation, the following experimental runs may be considered.

*Example 1.*—One volume of petrolatum having a melting point of 148° F. is diluted with three volumes of ethylenedichloride and filtered through an apparatus of the type shown in Fig. 1 at 100° F. The filter cake is washed with one volume of the same solvent and an oil yield of 77% of the original wax was recovered. The separated wax had a melting point of 172° F.

*Example 2.*—A heavy lubricating distillate from a Van crude having a viscosity of 85 seconds Saybolt at 210° F. was treated with acid and clay in a well-known manner and was then diluted with a solvent comprising 75% of ethylenedichloride and 25% carbon tetrachloride. Two volumes of solvent were used per volume of oil. The separation was then effected in a centrifugal filter at a temperature of 0 to 5° F. and a yield of 76% of an oil having a 10° pour point was recovered. Similar results were obtained with a solvent containing 60% of ethylenedichloride and 40% of dichlorethylene.

*Example 3.*—A similar waxy lubricating distillate having a viscosity of 62 seconds Saybolt at 210° F. was diluted with the same solvent used in Example 2 and the filtration was conducted at 10° F. The oil yield was 79% and showed a 20° F. pour point.

*Example 4.*—Over a period of more than a week 53 wax cakes of various types were built up in successive batch runs and each time the cake was removed by merely scraping the cloth filter with a metal knife. No attempt was made to back-wash or otherwise clean the filter cloth after any of the successive runs. Over this period the filtration rate was found to be substantially constant with no falling off being observed. On scraping the cloth after the last run it was found that it was not plugged with wax to any appreciable extent.

*Example 5.*—A cake of so-called amorphous wax was built up in the centrifugal filter of the type shown in Figure 1 and spun until the flow of oil from the apparatus was greatly reduced. The cake was then washed by adding one volume of ethylene dichloride (specific gravity 1.26) and the filter was continuously rotated. Within 50 seconds the entire volume of the wash liquor was collected after passing through the wax cake.

The cake was then washed with one volume of normal butyl alcohol (specific gravity .81) in a similar manner. The rate at which the wash liquor was collected is given in the following table:

| Time (minutes) | Percent wash liquor collected |
|---|---|
| 30 | 12.5 |
| 45 | 25.0 |
| 60 | 42.5 |
| 90 | 75.0 |
| 150 | 90.0 |

This illustrates the effect of the rate of washing (and analogously of filtration) by a proper and an improper use of differential pressures. In the first instance the density of the wash liquor is heavier than the wax and the differential pressure exerted on the liquid constituents is greater than that exerted on the solid. For this reason, the liquid passed through the cake with great rapidity and was collected within 50 seconds. In the second instance the relative densities were reversed and the rate at which the liquid was discharged was greatly diminished.

All traces of the butyl alcohol were removed from the wax cake by small amounts of ethylene dichloride and then one volume of the latter was added to wash the cake. This volume of solvent was collected in full after a period of about 65 seconds. This illustrates the fact stated previously that the use of properly applied differential pressures automatically cleans the cloth.

*Example 6.*—A lubricating distillate from a Reagan crude having a viscosity of 57 seconds Saybolt at 210° F. was diluted with the same solvent used in Example 2 and the wax crystals removed by filtration in a basket centrifuge at 0° F. A yield of 72% of oil having a pour of 15° F. was obtained.

The present invention is not to be limited to any theory of the operation of the filter nor to any particular solvent or type of waxy stock, but only to the following claims in which we wish to claim all novelty inherent in the invention.

We claim:

1. An improved process for the separation of solid waxy hydrocarbons from liquid hydrocarbons comprising the steps of diluting with an organic liquid miscible with oil but of low solvent power for wax and having a density greater than that of the wax and being added in such proportion as to increase the density of the liquid constituents above that of the wax, adjusting temperature to solidify the solid constituents and forcing the oil-wax mixture outwardly against a filtration membrane by centrifugal force whereby the force acting on the diluted oil is greater than that acting upon the wax, and withdrawing the oily filtrate from the other side of the filtration membrane.

2. An improved process for the removal of petrolatum waxes from liquid hydrocarbons comprising diluting the oil with a solvent of a density greater than the wax and in proportions to increase the density of liquid constituents above that of the wax, adjusting the temperature of the diluted oil to cause solidification of the wax, feeding the slurry of solid wax outwardly against a filtration membrane under positive pressure sufficient to form a filter cake under the action of centrifugal force, whereby the pressure exerted on the oil is in excess of that exerted on the wax, and withdrawing the filtrate from the other side of the filtration membrane.

3. A process according to claim 2 in which the solvent comprises a chlorinated organic liquid.

4. A process according to claim 2 in which the solvent is a chlorinated olefine.

5. A process according to claim 2 in which the solvent comprises dichlorethylene.

6. An improved process for the separation of wax from mineral oils comprising diluting the oil with an organic liquid miscible with the oil but of low solvent power for wax, the amount and density of said liquid being adapted to produce on cooling the mixture liquid and solid phases which differ in density by an amount greater than the difference in density between wax and the oil normally associated therewith, chilling to solidify the wax and feeding the mixture against one side of a filtration membrane under the influence of centrifugal force which produces positive pressure sufficient to form a cake.

7. An improved process for the separation of oil wax mixtures according to claim 6, comprising diluting the oil with a solvent liquid lighter than the oil, chilling to solidify the wax and feeding the mixture of diluted oil and solid wax inwardly against a filtration membrane under the action of centrifugal force and withdrawing the filtrate from the other side of the filtration membrane.

EGER V. MURPHREE.
EDWARD D. REEVES.